Nov. 16, 1954  D. BIERMANN  2,694,459
VARIABLE PITCH PROPELLER CONTROL LATCH MECHANISM
Filed Dec. 27, 1949  7 Sheets-Sheet 1

INVENTOR
DAVID BIERMANN
BY *Toulmin & Toulmin*
ATTORNEYS

Nov. 16, 1954 D. BIERMANN 2,694,459
VARIABLE PITCH PROPELLER CONTROL LATCH MECHANISM
Filed Dec. 27, 1949 7 Sheets-Sheet 2

INVENTOR
DAVID BIERMANN
BY
Toulmin & Toulmin
ATTORNEYS

Nov. 16, 1954   D. BIERMANN   2,694,459
VARIABLE PITCH PROPELLER CONTROL LATCH MECHANISM
Filed Dec. 27, 1949   7 Sheets-Sheet 4

INVENTOR
DAVID BIERMANN
By Toulmin & Toulmin
ATTORNEYS

United States Patent Office 2,694,459
Patented Nov. 16, 1954

2,694,459

VARIABLE PITCH PROPELLER CONTROL LATCH MECHANISM

David Biermann, Piqua, Ohio, assignor to Hartzell Industries, Inc., Piqua, Ohio, a corporation of Ohio Application December 27, 1949, Serial No. 135,203

15 Claims. (Cl. 170—160.16)

This invention particularly relates to aircraft propellers incorporating a control for changing the pitch of the blades of the propeller from one predetermined position to another during flight.

It has been determined that in many instances a variable pitch propeller having a low pitch and a high pitch is sufficient to take care of average flight conditions, and this is particularly true for propellers used on light aircraft. However, it is desirable that a propeller shall be locked in low pitch position during take-off of an aircraft and during climb of the aircraft in flight. Only after the aircraft has reached the desired cruising level, and has leveled off for cruising shall the propeller be permitted to change from a low pitch position to a high pitch position that is used for cruising or high speed.

It is therefore an object of this invention to provide a changeable pitch propeller in which a resiliently acting force urges the blades of the propeller to a low pitch position and a centrifugally acting force works against the resiliently acting force to urge the propeller blades into a high pitch position, but which centrifugally acting force is kept from changing the pitch of the propeller blades until the engine speed is sufficiently high to permit a change from low pitch to high pitch without endangering the occupant of the aircraft, and specifically, the change from low pitch to high pitch can occur only after the aircraft is leveled off for cruising.

It is an object of this invention to provide a changeable pitch propeller having a control in which a resiliently acting force urges the blades of the propeller into a low pitch position and a centrifugally acting force works against the resiliently acting force to urge the propeller blades into a high pitch position, which control includes a mechanism to restrain movement of the propeller blades under action of the centrifugally acting force until engine speed of the aircraft on which the propeller is located is sufficiently high that a change of pitch from low pitch to high pitch can be made under conditions of safe flight.

It is another object of the invention to provide a propeller in accordance with the foregoing object wherein the mechanism which restrains the centrifugally acting force from changing the pitch of the propeller blades is also a centrifugally responsive device in the nature of a pilot control which must operate before the centrifugally responsive device which acts against the resiliently acting force can function, thus insuring operation of the propeller at a predetermined speed before the propeller blades will be changed from low pitch to high pitch.

Another object of the invention is to provide a control for a changeable pitch propeller having a resiliently acting mechanism for urging the blades of the propeller into low pitch position and a primary centrifugally responsive mechanism acting against the resiliently acting mechanism to urge the propeller blades into high pitch position, and which control includes a secondary centrifugally responsive mechanism operably connected with the primary centrifugally responsive mechanism to restrain operation of the primary mechanism until after operation of the secondary mechanism.

It is another object of the invention to provide a propeller of the kind referred to wherein a secondary centrifugally operated mechanism is provided to prevent operation of a primary centrifugally operated mechanism from shifting the blades of the propeller from low pitch to high pitch until cruising speed of the engine is reached.

It is another object of the invetnion to provide a propeller in accordance with the foregoing object wherein the secondary centrifugally operated mechanism is a lock or latch which is centrifugally operated.

It is another object of the invention to provide a propeller in accordance with the foregoing object wherein the centrifugally operated latch or lock is composed of a primary latch and a secondary latch mechanism in which the secondary latch responds to the speed of the engine or to the speed of the propeller before permitting operation of the primary latch which in turn after operation thereof permits operation of the primary centrifugally responsive blade shifting mechanism.

It is another object of the invention to provide a propeller in accordance with the foregoing objects wherein the secondary control is so constructed that the pilot of an aircraft may change the pitch of the blades of the propeller from high pitch to low pitch while in flight, and the secondary control will prevent the blades of the propeller from returning to high pitch until the engine speed is again within the cruising range.

It is still another object of the invention to provide a propeller in accordance with the foregoing objects wherein the latch or lock consists of a primary latch that directly restrains operation of the centrifugally acting device which changes the propeller blades from low pitch to high pitch, and which primary latch is controlled by a secondary latch or lock responsive to engine speed or propeller speed, thus a small force acting on the secondary latch can restrain a large force acting on the primary latch.

Still another object of the invention is to provide a propeller and control for the same in accordance with the foregoing objects wherein suitable adjustments are provided to change the operating range of the control for the propeller so as to match the propeller with an aircraft on which it is placed.

Further object and advantages will become apparent from the drawings and the following description.

The propeller of this invention is a two-pitch propeller in which the blades are set at a low pitch position for takeoff and climb of an aircraft, and are set in a high pitch position for cruising or high speed.

It has been determined that changes in altitude do not necessarily alter the two basic pitches, that is, a low pitch and a high pitch position of the blades of the propeller, so long as the engine is not super-charged. This follows from the fact that the same physical laws which affect the power of the engine also apply to the power absorption of the propeller. Thus, an aircraft may climb from sea level to its ceiling with the propeller in low pitch position, and the engine speed will remain substantially constant. Also, an aircraft may be cruised at any given throttle setting at any altitude and the engine speed will again remain substantially constant.

As the altitude of the aircraft is increased, throttle opening is increased to compensate for the reduction in air density while the absolute manifold pressure or engine power remains substantially constant. Thus, as the altitude is increased, up to a point where the throttle of the aircraft is wide open, the engine power remains substantially constant while the density of the air reduces, which lowers the drag of the aircraft. This relationship gives rise to an increased air speed of the aircraft with increasing altitude.

Thus, the increased air speed will result in an increased engine speed, since engine speed is nearly directly proportional to air speed at cruising speeds of the aircraft.

The altitude at which full throttle is reached for a cruising condition of 60% to 75% engine power, particularly for engines that are not supercharged, ranges between 5,000 feet and 7,000 feet. Gain in air-speed of the aircraft, and consequently a proportional gain in engine speed with increased altitude at constant power is approximately 1% per 1,000 feet of altitude. This fact has been established many times. Hence, the gain in engine speed with the pitch of the propeller of the aircraft established at one value would only be about 5% to 7% from sea level to altitudes of 5,000 feet to 7,000 feet. From these altitudes on up to the ceiling of the aircraft there is substantially no increase in engine speed. In fact, engine speed tends to drop slightly above these altitudes.

It will be apparent, therefore, that a two position propeller, that is, one having a low pitch position and a high pitch position, does not sacrifice performance, and can be justified by the saving in cost, maintenance and simplicity of operation over a fully automatic, infinitely variable pitch propeller.

The propeller of this invention utilizes two basic forces to change the pitch of the blades from a low pitch position to a high pitch position. A resiliently acting device in the form of a coil spring is used to urge the blades of the propeller to low pitch position while centrifugally acting means, utilizing the action of centrifugal force, in the form of counterweights attached to the blades, is used to oppose the action of the resilient spring to place the blades of the propeller in high pitch position.

Inasmuch as centrifugal force acting through the counterweights increases rapidly as the engine speed increases, and the resilient spring produces a relatively constant force regardless of the engine speed, it is apparent that if the centrifugally acting counterweights are permitted freedom of action, and are opposed only by the resilient spring, that the blades of the propeller will be urged toward their high pitch position by the centrifugally acting counterweights slowly and gradually as the engine speed increases.

However, from an operational point of view, it is necessary to restrain the centrifugally acting counterweights from placing the propeller blades in high pitch position until the aircraft has completed a take-off and climb, and has assumed a level flight attitude near the cruising speed. At this time it is then desirable for the pitch of the propeller to be changed from the low pitch position to the high pitch position.

In this invention, there is, therefore provided a restraining device that is responsive to engine speed to prevent the centrifugally acting counterweights from shifting the propeller blades from low pitch position to high pitch position until engine speed has increased above a predetermined value. During a normal take-off and climb to cruising altitude, the engine sped of an aircraft is below a determined value, and which is lower than the engine speed in cruising flight. This is due to the fact that the engine of the aircraft is loaded and it cannot attain its maximum engine speed during take-off and climb. However, after the aircraft has reached cruising level, and has assumed a level flight condition, then load on the engine being reduced, engine speed will increase above the value of that obtained during take-off and climb. At this time, the blades of the propeller can be shifted from a low pitch to a high pitch position which will be accomplished automatically by the pitch control of this invention.

Should the pilot elect to resume climb, after level flight conditions have been reached and the propeller has been shifted to high pitch position, he need only to momentarily reduce engine speed below the point at which the resiliently acting spring overcomes the centrifugal forces acting through the counterweights. The pitch control will then return the blades of the propeller to low pitch position and retain them in this position. The pilot can then increase engine speed and maintain climb.

The pilot, therefore, has sufficient control over the pitch control mechanism to enable him to position the pitch of the propeller in either high pitch position or low pitch position at will, and yet it is impossible for him to place the propeller into a dangerous high pitch position during take-off and climb or approach for landing once the propeller has been placed in low pitch position.

In the propeller of this invention disclosed in Figures 1 to 4 inclusive, the propeller hub consists of the two hub shells 10 and 10a that are split along a plane defined by the axes of the blades 11 and 11a, and the two shell halves are secured together by bolts 12. The hub formed by the shell halves 10 and 10a is secured to the flange 13 of a motor shaft 14 by means of bolts 15.

The propeller blades 11 and 11a have their hubs 16 and 16a secured in ferrules 17 and 17a, respectively. The ferrules 17 and 17a are supported by ball thrust bearings 18 and 18a respectively, pre-load washers 19 and 19a being positioned against the ferrules 17 and 17a to hold them tightly against the bearings 18 and 18a which absorb the radial thrust load of the blades 11 and 11a.

Figure 1:
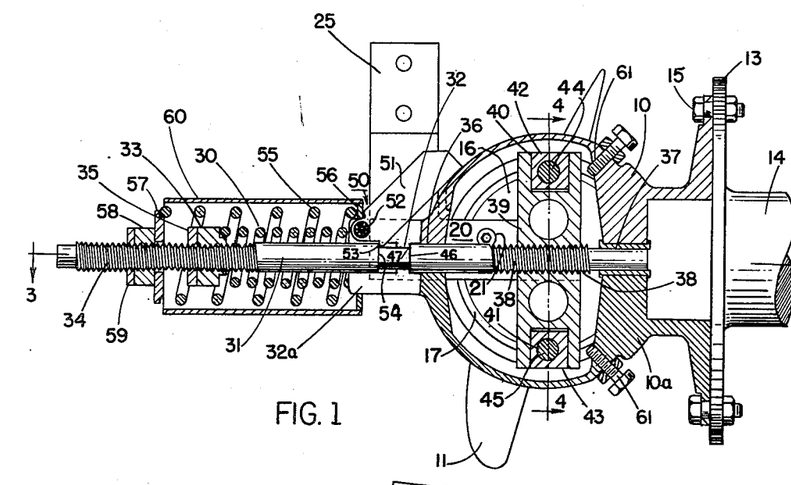
Figure 1 is a vertical cross-sectional view of a propeller incorporating the control of this invention with the propeller blades and the control mechanism shown in low pitch position of the propeller blades taken along line 1—1 of Figures 3, 21 and 23.
Figure 2:
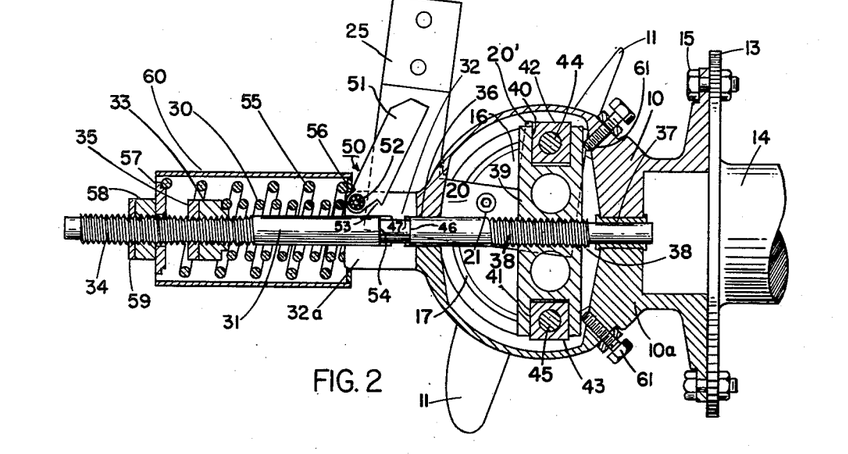
Figure 2 is a cross-sectional view like that of Figure 1 but with the propeller blades and the control mechanism illustrated in the high pitch position of the propeller blades.
Figure 3:
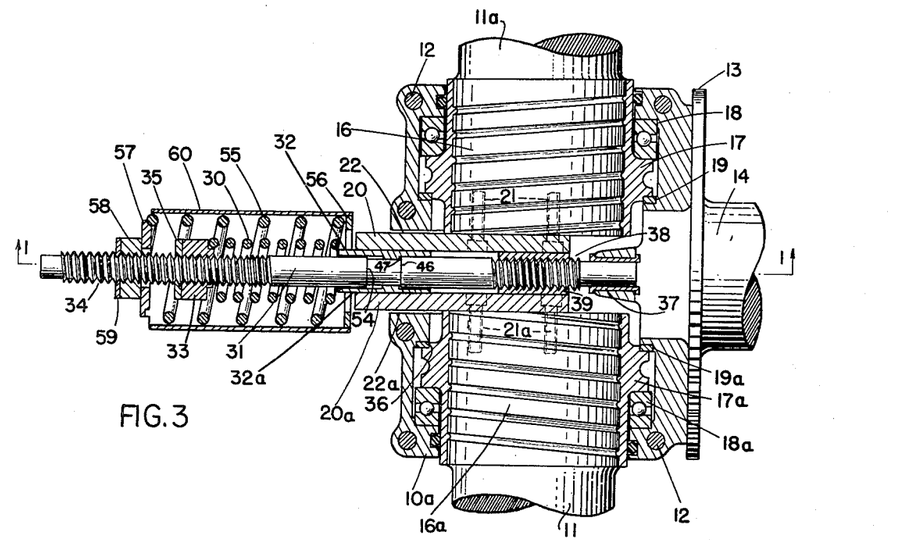
Figure 3 is a cross-sectional view taken along line 3—3 of Figure 1.
Figure 4:
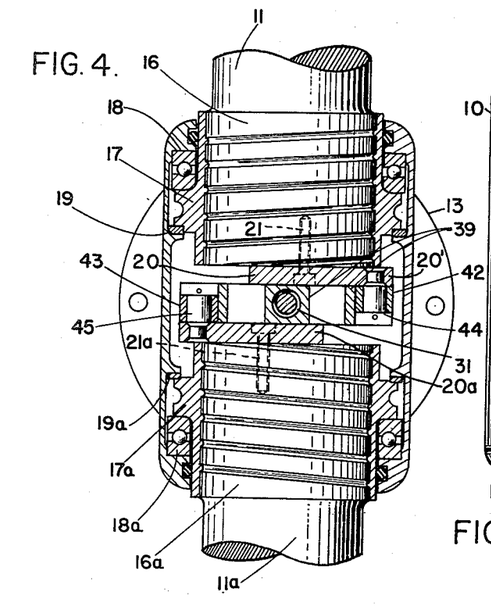
Figure 4 is a cross-sectional view taken along line 4—4 of Figure 1.

Counterweight arms 20 and 20a are secured to hubs 16 and 16a respectively by means of bolts 21 and 21a. Each arm, 20 and 20a, has a right angular extension, as 20', which is pivoted to yoke 25 by means of pins 34 and 35. These counterweight arms 20 and 20a project through slots 22 and 22a provided in the shell halves 10 and 10a, as shown in Figure 3. Each of the counterweight arms 20 and 20a receives a counterweight 25 at the outer end thereof, as illustrated in Figures 1 and 2 on counterweight arm 20. Thus, rotation of propeller 11 on the axis of motor shaft 14 causes counterweight arms 20 and 20a to revolve about rod 31. Because of this rotation a centrifugal force is set up which acts outwardly from rod 31 and lies in the plane of weight 25 and this force tends to move weight 25 outwardly at right angles from rod 31. However, since arms 20 and 20a are rigidly attached to their respective hubs (for example, 20 at 21) and are pivoted to yoke 39 (for example, 20' at 44), weights 25 will pivot around pins 44 and 45 and in so doing will twist the propeller blades around with them as best seen in Fig. 2. Thus, rotation of the propeller on the axis of the motor shaft 14 causes the primary centrifugally acting counterweights 25 to urge the propeller blades into a high pitch position, that is, clockwise rotation of the blade 11, as viewed in Figures 1 and 2. In Figure 1 the blade 11 is illustrated in low pitch position whereas in Figure 2 the blade 11 is illustrated in high pitch position.

A resiliently acting coiled spring 30 acting through the control rod 31 is provided to urge the propeller blade 11, and thus the propeller blade 11a, into low pitch position. The shells 10 and 10a provide projecting bosses 32 and 32a at each side of the control rod 31 against which one end of the spring 30 rests. The opposite end of the spring 30 engages an adjusting nut 33 threadedly engaging the threaded end 34 of the rod 31, a jam nut 35 being provided to lock the adjusting nut 33 onto the rod 31.

The opposite end of the control rod 31 is slidably journalled in bearing journals 36 and 37 provided in the shell halves 10 and 10a. Also, the opposite end of the control rod 31 is provided with a threaded portion 38 that receives a yoke 39 which projects from the rod 31 at opposite sides thereof, as shown in Figures 1 and 2.

The yoke 39 is threadedly received on the threaded portion 38 of the rod 31 and is provided with journals 40 and 41 at opposite ends thereof. The journals 40 and 41 slidably receive the blocks 42 and 43 respectively, which in turn are connected with the counterweight arms 20 and 20a respectively, by means of pins 44 and 45 respectively, thus forming a Scotch yoke by which axial movement of the rod 31 normal to the axis of the blades 11 and 11a transforms the motion into rotary motion of the blades on their respective axes.

The resilient spring 30 urges the control rod 31 in a left-hand direction, as viewed in Figure 1, to place a shoulder 46 against a low pitch position stop 47 formed by projections on the boss extensions 32 and 32a. It will thus be seen that the centrifugally acting counterweights 25 oppose the action of the spring 30 to urge the blades 11 and 11a into a high pitch position.

The centrifugally acting counterweights 25 are prevented from normally rotating the blades 11 and 11a on their axes by means of a secondary centrifugally responsive device 50 that prevents movement of the control rod 31 in a rightward direction which in turn prevents rotation of the blades 11 and 11a on their axes since the control rod 31 is connected with the blades through the yoke 39, the blocks 42 and 43 and their connecting pins 44 and 45.

The secondary centrifugally responsive device 50 consists of a centrifugally acting weight 51 that is carried on a pivot bearing 52 extending between the boss extensions 32 on the upper shell 10. This centrifugally acting weight 51 has a latch projection 53 that engages a shoulder 54 on the rod 31 to prevent movement of the rod in a rightward direction when the weight 51 is in the position shown in Figure 1.

The latch weight 51 is retained in the position shown in Figure 1 by means of a resilient coiled spring 55, that has one end thereof engaging a washer 56 that in turn engages the latch-weight 51 to urge it in a clockwise rotation about the pivot bearing 52. The opposite end of the spring 55 engages a washer 57 that in turn engages an adjusting nut 58 for adjusting compression of the spring 55, and which adjusting nut 58 is locked by a jam nut 59. A shell 60 houses the springs 55 and 30, and is carried by the washer 56.

In Figure 1 the propeller and pitch control mechanism is shown with the propeller blades in low pitch position. The spring 55 is adjusted so that the latch-weight 51 retains its latching engagement with the rod 31 until centrifugal force acting on the latch-weights 51 is sufficiently great to cause release of the latch 53 from the shoulder 47 on the rod 31. The spring 55 is adjusted so that this release will not occur until engine speed is above that normally developed during take-off and climb of the aircraft.

Thus, during takeoff and climb of the aircraft the centrifugally acting weights 25 cannot cause rotation of the propeller blades on their axes to shift them from low pitch to high pitch position.

When cruising conditions are reached, and the engine has increased its speed to cruising speed, centrifugal force acting on the latch-weights 51 will cause them to rotate in a counter-clockwise direction around the pivot bearing 52 to release the latch 53 from the shoulder 54 on the control rod 31, as shown in Figure 2. Centrifugally acting weights 25 can then rotate the propeller blades on their axes, since rod 31 is now free to move in a right-hand direction, until the yoke 39 engages the high pitch stops 61 which are adjustable for maximum high pitch position.

Should the pilot decide to resume climb after cruising conditions have once been established, it is only necessary for him to reduce engine speed to a value below normal cruising speed. When this occurs, spring 30, which is adjusted to overcome the centrifugal force acting on weights 25 when engine speed is below a normal cruising speed, will move the rod 31 in a leftward direction, as viewed in Figure 1, to rotate the blade 11 in a counter-clockwise rotation and return it to low pitch position. At this time, latch-weight 51 will re-engage rod 31 so that the pilot can then increase engine speed and resume climb.

In the apparatus illustrated in Figures 1 to 4 inclusive, centrifugal force acting on the counter-weights 25 is quite large, hence it is necessary to have a relatively strong spring 30 to oppose this force to return the propeller blade to low pitch position when desired by the pilot during flight conditions. Thus, since the spring 30 must be relatively strong to return the blades of the propeller to their low pitch position, it is the natural result that the counterweights 25 must create sufficient force to overcome the action of the spring 30. Hence, the requirement for large centrifugal forces in acting on the propeller.

Thus, the secondary centrifugally acting, or engine speed responsive latch-weights 51 must release a relatively large primary force when permitting shifting of the propeller blades from low pitch position to high pitch position. To oppose the primary centrifugally acting force of the counterweights 25 requires that the latch-weights 51 be opposed in their rotation about their pivot bearing by a force of relatively large value to prevent the centrifugally acting weights 25 from rotating the latch-weights 51 about their pivots and thus releasing itself, rather than controlling its release by the auxiliary control.

To provide for a more sensitive control of the release of the centrifugally acting counterweights, there is disclosed in Figures 5 to 13 inclusive, a modified arrangement of the secondary centrifugally responsive control in which a primary latch which releases the centrifugally acting force of the primary counterweight is controlled by a secondary latch. Thus, relatively light control forces on the secondary latch are sufficient to control the operation of the primary latch, and thus make for a more sensitive control device.

In the propeller disclosed in Figures 5 to 13 inclusive, the propeller hub 100 is non-rotatably carried on the engine shaft 101 through a splined portion 102. A hub-nut 103 engages the threaded portion 104 on the shaft 101 to retain the tapered jam-ring 105 against the hub 100, and thus retain it on the engine shaft 101.

Figures 5, 6, 7, 24:
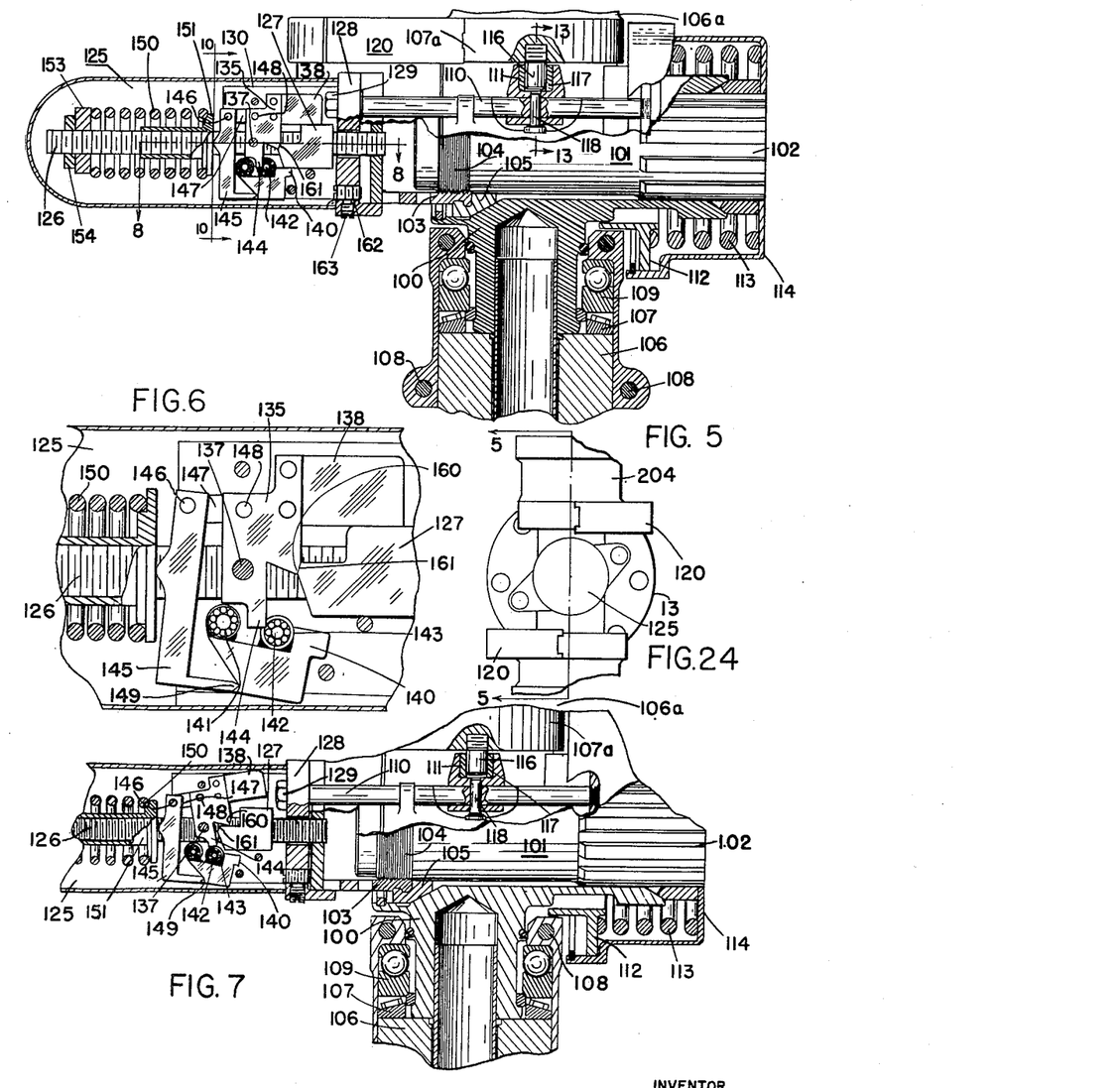
Figure 5 is a cross-sectional view of a modified arrangement of the control for a propeller incorporating a primary and secondary latch arrangement, taken along line 5—5 of Figure 24.
Figure 6 is an enlarged partial cross-sectional view of the latch arrangement illustrated in Figure 5, illustrating the secondary latch in unlatched position.
Figure 7 is a cross-sectional view of the propeller and control for the same of Figures 5 and 6 illustrating the primary and secondary latches in unlatched positions.
Figure 24 is a front elevational view of the apparatus illustrated in Figure 5.

The propeller blades are rotatable on their own axes, and as illustrated in Figure 5, the blade 106 is carried in a split hub 107 secured together by the bolts 108. A ball thrust bearing 109 is engaged by the inner end of the hub 107 and carries the radial thrust of the blade 106.

The blade hubs 107 are each connected to a rod 110 and a pivot connection 111 with an actuating plate 112 that is engaged by one end of a compression spring 113 that urges the plate 112 in a left-hand direction, as viewed in Figure 5, to rotate the blades 106 about their own axes and position them in a low pitch position. It will be understood that only one of the rod and pivot connections 110, 111 are illustrated for blade 106a, but that the blade 106 has a similar connection operating 180° opposite to that of the blade 106a.

The spring 113 is carried in a spring-cage 114 so that the spring will apply its force against the actuating plate 112. The rod 110 threadedly engages the plate 112 so that movement of the rod will cause rotation of the propeller blade on its axis through the pivot connection 111.

The pivot connection 111 consists of a pin 116 threadedly received in the blade hub 107a which rotates in a member 117 through which rod 110 passes. The rod 110 is connected with the member 117 through a pin 118.

Centrifugally acting counterweights 120 are secured to each of the blade hubs 107 and 107a to cause rotation of the blades on their axes in opposition to the spring 113 for positioning the blades in a high pitch position.

Control of the action of the primary centrifugally acting counterweights 120 is obtained through the secondary centrifugally acting pitch control 125. This pitch control consists of a threaded rod 126 that is secured to the hub nut 103, and is thus stationary relative thereto. The rod 126 carries a nut 127 that threadedly engages the same and is stationary relative thereto.

The pitch control 125 also includes a base plate 128 that is secured to the rod 110 by means of nuts 129. The base plate 128 carries projecting side plates 130 and 131, shown in Figures 8, 10 and 11.

Figure 8:
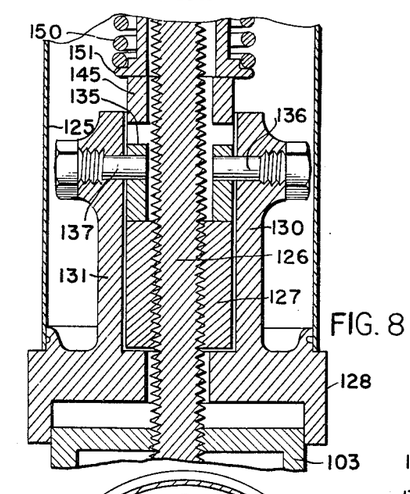
Figure 8 is a cross-sectional view taken along line 8—8 of Figure 5.

A primary latch 135 is pivoted between the side plates 130 and 131 on pivot pins 136 and 137 that are threadedly received in the side plates 130 and 131, as shown in Figure 8. The primary latch 135 carries a counterweight 138 which urges the latch 135 in a counter-clockwise rotation around the pivots 136 and 137 upon rotation of the apparatus on the axis of the engine shaft 101.

Figure 11:
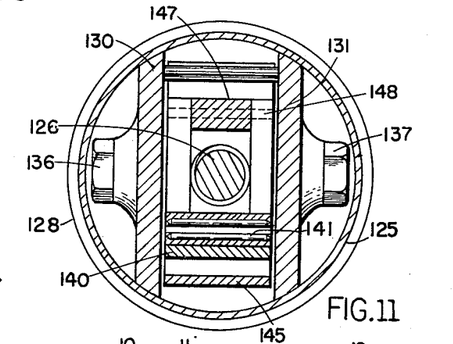
Figure 11 is a cross-sectional view taken along line 11—11 of Figure 9.
Figure 12:
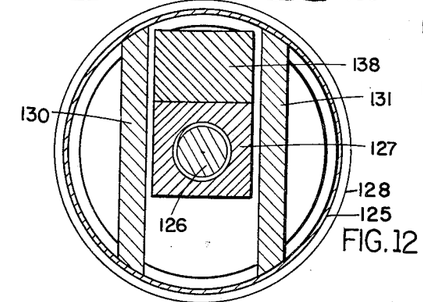
Figure 12 is a cross-sectional view taken along line 12—12 of Figure 9.
Figure 13:
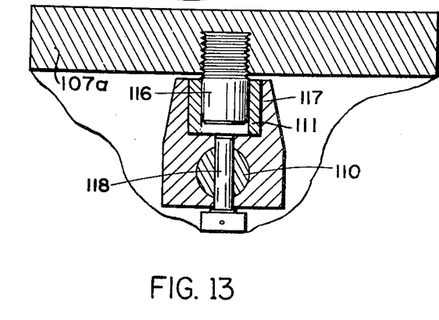
Figure 13 is an enlarged cross-sectional view taken along line 13—13 of Figure 5.

The primary latch 135 is prevented from rotation on the pivot pins 136 and 137 by means of a secondary latch 140 which is carried on the non-friction pivot bearing 141 extending between the plates 130 and 131 as shown in Figure 11. This secondary latch 140 carries a rod 142 in a non-friction bearing 143 that is engaged by the tail 144 extending downwardly from the primary latch 135 when the latches are in the position shown in Figures 5 and 9.

Figure 9:
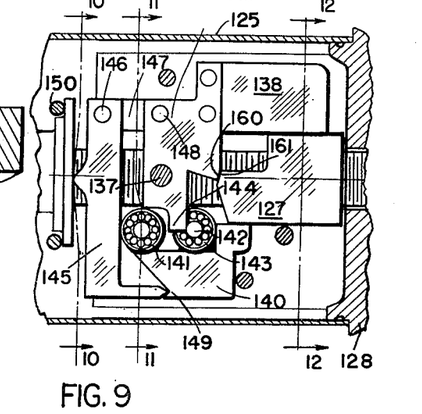
Figure 9 is an enlarged elevational view of the latch mechanism of the control.
Figure 10:
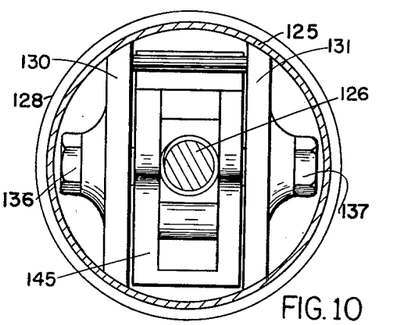
Figure 10 is a cross-sectional view taken along line 10—10 of Figure 9.

The secondary latch 140 is retained in its position illustrated in Figures 5 and 9 by means of a lever 145 that is pivoted on the pin 146 provided at one end of a link 147 that extends from the primary latch 135 and which is held thereto by a pin connection 148. The opposite end of the lever 145 engages the secondary latch 140 through a knife-edge engagement 149.

A coiled spring 150 has one end thereof engaging a spring guide 151 that is slidable on the rod 126 which in turn engages bosses 152 provided at opposite sides of the rod 126 on the lever 145. The opposite end of the spring 150 engages an adjusting nut 153 threadedly received on the rod 126, and which is held in its adjusted position by a jam nut 154.

The centrifugally acting counterweights 120 on the blade hubs 107 and 107a attempt to rotate the blades about their axes, but they cannot function for this purpose so long as the primary latch 135 has the nose 160 thereon engaging the nose 161 on the stationary nut 127, and this engagement is retained so long as the secondary latch 140 is held in the position shown in Figure 9 by means of the spring 150.

For the centrifugally acting counterweight 120 to rotate the blade 107a on its axis, it is thus necessary for the rod 110 and the base 128 of the control 125 to move in a rightward direction, as viewed in Figure 5, upon release of the primary latch 135 from the nut 127 a distance controlled by the high pitch stop 162 which is adjustable in the base 128 and held in adjusted position by means of a jam screw 163.

To set the device in operating condition, the spring 113 is set to place the blades of the propeller in low pitch position at any engine speed below a normal cruising speed. Thus, at any engine speed below normal cruising speed the pitch control 125 will have its various parts assume the positions shown in Figures 5 and 9. The spring 150 in the pitch control is adjusted so that the centrifugal force on the secondary latch 140 will cause it to rotate about its pivot 141 only after engine speed is above a determined value required for takeoff and climb of the aircraft, and within the cruising speed range.

When the engine speed reaches cruising speed range, when the aircraft has levelled off for cruising flight, centrifugal force acting on the secondary latch 140 will cause it to rotate clockwise about its pivot 141 to release the tail 144 of the primary latch 135.

If engine speed is sufficiently high at this time, centrifugal force acting on the counterweight 138 of the primary latch 135 will cause the primary latch to rotate counter-clockwise about its pivot pins 136 and 137 to release the nose 160 thereof from the nose 161 of the nut 127, and thereby permit right-hand movement of the pitch control, as viewed in Figure 5, to permit the centrifugally acting counterweights 120 to place the propeller blades in high pitch position.

Should the pilot desire to again resume climb, he need only reduce engine speed below that for normal cruising, as previously mentioned with reference to the operation of the device disclosed in Figures 1 to 4, and the spring 113 will overcome the effect of the counterweight 120 to reset the pitch control 125 with the latches assuming their positions shown in Figure 5.

Figures 14, 16:
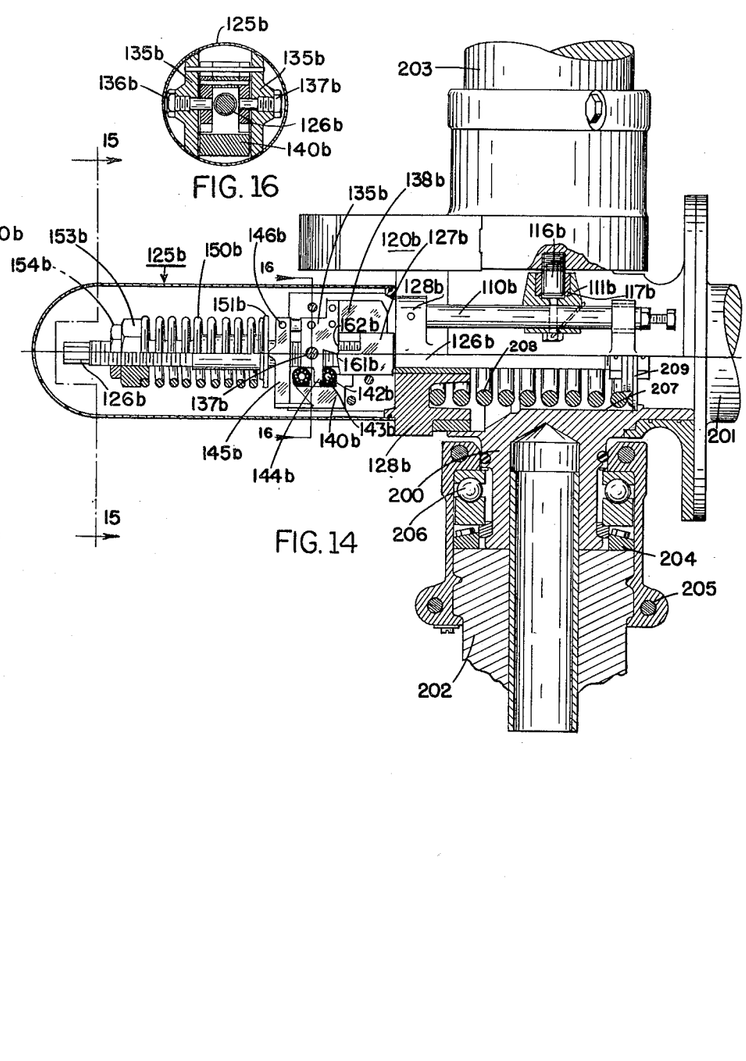
Figure 14 is a cross-sectional view of another modified arrangement of a propeller illustrating the modified position of the control spring which urges the propeller blades into low pitch position.
Figure 16 is a cross-sectional view taken along line 16—16 of Figure 14.
Figure 15:
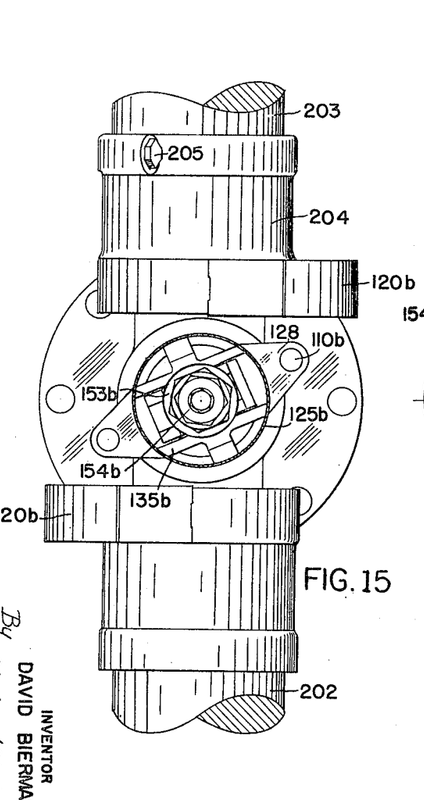
Figure 15 is a cross-sectional view taken along line 15—15 of Figure 14.

In Figures 14 to 16 inclusive there is illustrated a modified arrangement for the location of the spring that urges the blades of the propeller into low pitch position. In this arrangement the spring is placed within the propeller hub, rather than in a cage surrounding the hub as illustrated in Figure 5.

The propeller consists of the hub 200 that is secured to the engine shaft 201. The propeller blades 202 and 203 are connected to the hub 200 by means of a split hub fitting 204 connected together by bolts 205. A ball thrust bearing 206 is placed between the hub fitting 204 and the hub 200 in the same manner as disclosed in the device of Figure 5.

The hub 200 has an internal bore 207 that receives the spring 208 that serves the same purpose as spring 113 of the device illustrated in Figure 5.

One end of the spring 208 engages a stationary plate 209, and the opposite end thereof engages a base plate 128b that serves the same purpose as the plate 128 of the apparatus illustrated in Figure 5.

The rod 126b has one end thereof fixed to the plate 209 and carries the nut 127b that serves the same purpose as the nut 127 of the device of Figure 5. The pitch control 125b is constructed in the same manner as the control 125 illustrated in Figure 5, hence the corresponding parts of the pitch control 125b bear the same numerals as those illustrated in Figure 5 but with the suffix "b" added.

As far as the operation of the device illustrated in Figures 14 to 16 inclusive is concerned, it operates in exactly the same manner as that of the device illustrated in Figure 5

Figure 17:
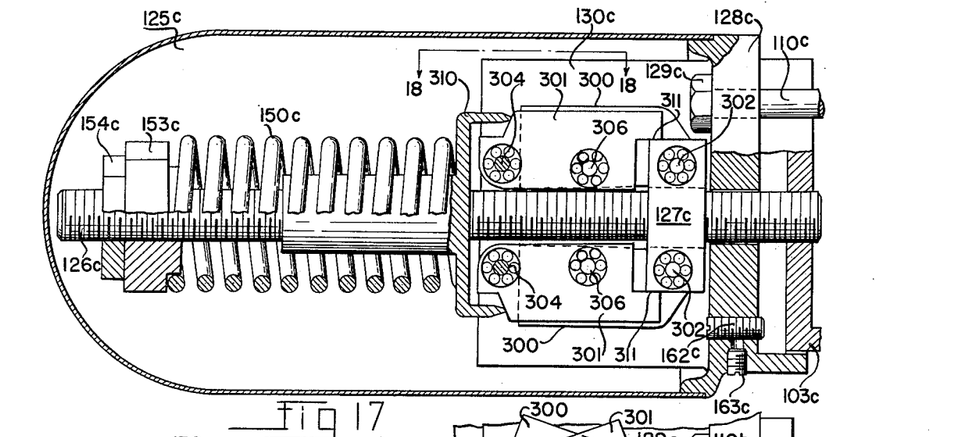
Figure 17 is a cross-sectional view of a modified arrangement of a secondary centrifugally responsive mechanism for controlling the primary centrifugally responsive device.
Figures 18, 19:
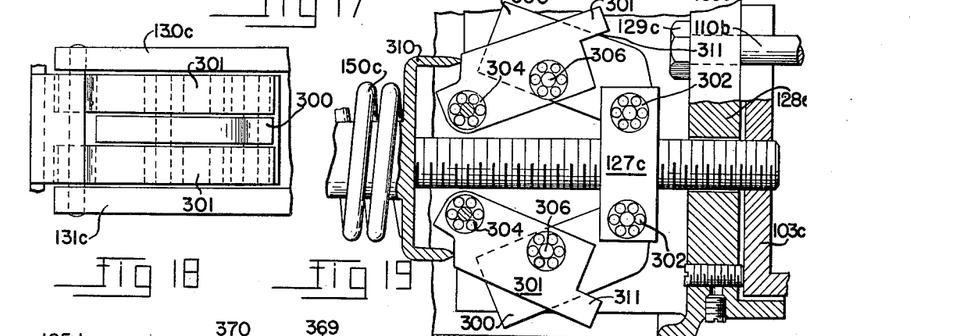
Figure 18 is a plane view of the centrifugally responsive elements shown in Figure 17, along line 18—18.
Figure 19 is a partial cross-sectional view similar to Figure 17 but illustrating the centrifugally operating mechanism in operation.

In Figures 17, 18 and 19 there is illustrated a modified arrangement of a centrifugally acting pitch control 125c which can be used in place of the pitch control 125 illustrated in Figure 5. Parts of the pitch control 125 that correspond with like parts of the pitch control 125 are identified with the same numerals attached to these parts in Figure 5, but with the suffix "c."

The hub nut 103c carries the threaded rod 126c on which there is located the nut 127c that threadedly engages the rod 126c and is stationary relative thereto.

The pitch control 125c also includes a base plate 128c that is secured to the rod 110c by means of nuts 129c. The rod 110c connects with the counterweights or blades of the propeller in the same manner as the rod 110 of Figure 5.

The base plate 128c carries projecting side plates 130c and 131c, shown in Figure 18.

A pair of toggle links 300 and 301 are positioned between the side plates 130c and 131c. The toggle links 300 are each pivotly carried on the nut 127c by the anti-friction bearings 302. The toggle links 301 are each pivotly carried on between the side plates 130c and 131c by means of the anti-friction bearings 304.

The toggle links 300 and 301 are inter-connected by means of a pivot bearing 306, the axis of which is positioned closer to the axis of the rod 126c than to the axes of the pivot bearings 304 and 302. Thus a line extending between the axes of the pivot bearings 304 and 302 will be radially beyond the axis of the pivot bearings 306, as shown in Figure 17.

The spring 150c has one end thereof engaging spring guide 310, which in turn engages the toggle links 301, which causes the toggle links to be urged toward the axis of the rod 126c, thus providing a locking arrangement between toggle links 300 and 301. Toggle links 301 have stop ledges 311 which limit the movement of the links toward the rod 126c.

The spring 150c has the other end engaging an adjusting nut 153c that is locked by a jam nut 154c.

In operation, the pitch control device 125c operates in much the same manner as the device heretofore described in that the pitch control does not permit the primary centrifugal weights on the propeller blades to act to rotate the blades to high pitch position until after the propeller has attained a predetermined minimum speed.

The toggle links 300 and 301 of the pitch control 125c are influenced by centrifugal force as the pitch control is rotated with the propeller on their axes of rotation. Thus, when propeller rotation reaches a predetermined minimum speed, the toggle links 300 and 301 will move outwardly relative to the threaded rod 126c to the position illustrated in Figure 19. This action will allow the base place 128c to move inwardly toward the hub nut 103c and thereby permit the counterweights on the propeller to shift the blades to the high pitch position, the base plate 128c at this time being free to move when the pivot axis 306 between the toggle links 300 and 301 is positioned radially beyond the line extending between the pivot axes 304 and 302 of the toggle links.

The spring 150c is adjusted to prevent operation of the toggle links 300 and 301 until a predetermined centrifugal force acts upon the toggle links as governed by the speed of rotation of the propeller.

Figure 20:
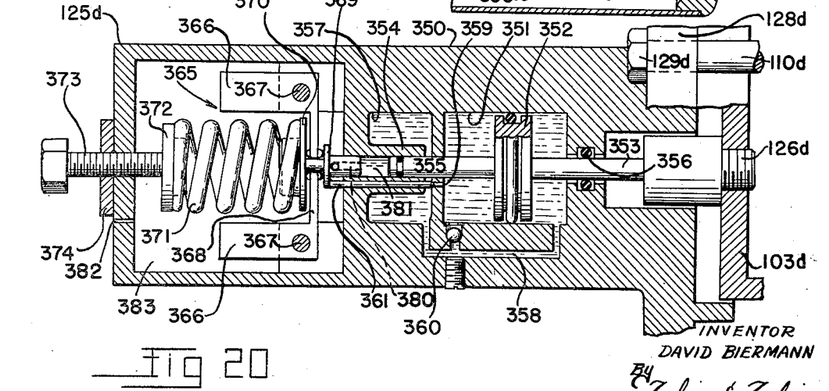
Figure 20 is a cross sectional view of another arrangement of a secondary centrifugally operated mechanism for restraining operation of the primary operation, which secondary mechanism is of the hydraulic type.
Figures 21, 22, 23:
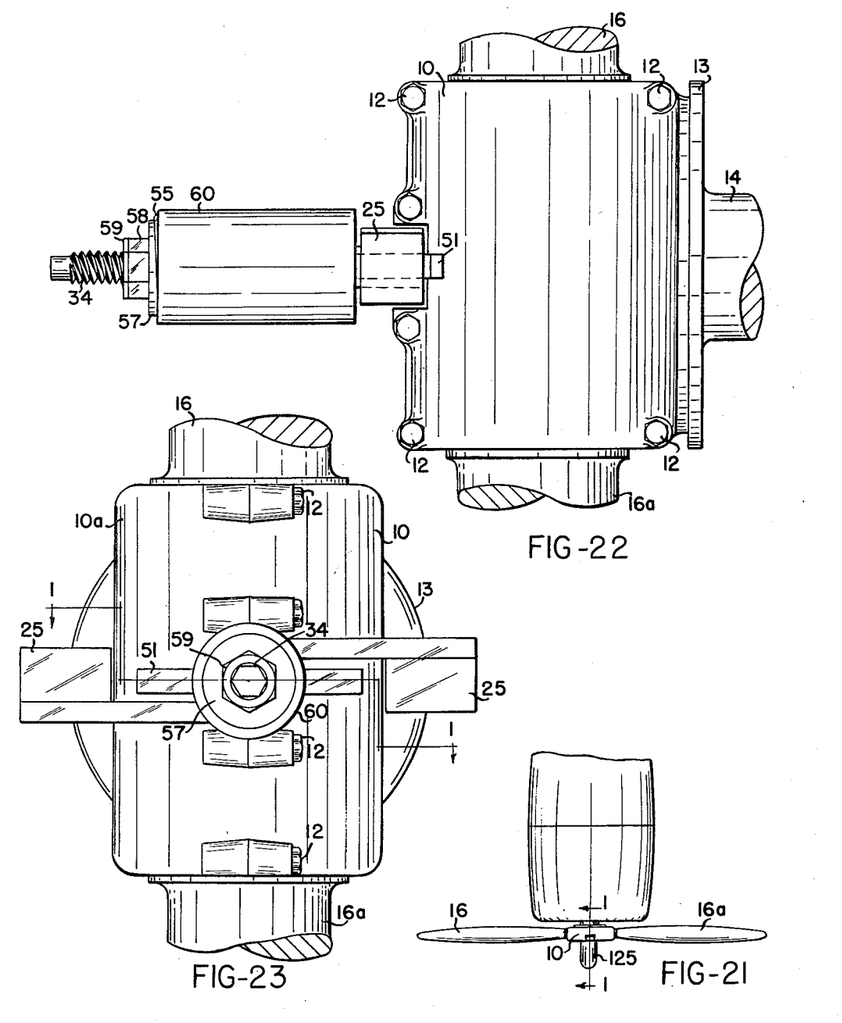
Figure 21 is a plan view of a portion of an aircraft incorporating the structure of this invention.
Figure 22 is a plan view of the structure illustrated in Figure 3.
Figure 23 is a front view of the structure illustrated in Figures 1, 2 and 3.
Figure 25:
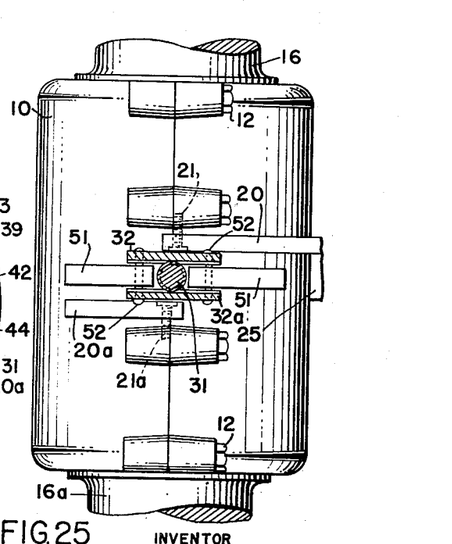
Figure 25 is an elevational view taken substantially on the line x—y of Fig. 3, looking in the direction of the arrows and showing certain parts in section and being partly broken away.

In Figure 20 there is illustrated a further modified arrangement of a pitch control 125d that can be used in place of the pitch control 125 or 125c, which control is a hydraulic apparatus rather than a mechanical locking or latching mechanism as heretofore described.

In the apparatus illustrated in Figure 20 the hub nut 103d, which corresponds to the hub 103 of Figure 5, is provided with a rod 126d secured thereto, and which corresponds with the threaded rod 126 of Figure 5.

The base plate 128d which corresponds with the base plate 128 of the apparatus of Figure 5 has a body projection 350 extending therefrom.

The body projection 350 is provided with a cylinder 351 which receives a piston 352 mounted on a plunger rod 353 that extends from the rod 126d. The piston 352 is therefore stationary relative to the hub nut 103, and to this extent corresponds with the nut 127 of the device shown in Figure 5.

The plunger rod 353 extends from each of opposite sides of the piston 352, and is slidable in the projection 354 in the body 350 externally of the cylinder 351 to provide a hydraulically balanced fluid chamber in the cylinder 351. "O" ring seals 355 and 356 can be used to seal around the plunger rod 353 to prevent loss of fluid from the cylinder chamber 351 and from the reservoir chamber 357. A pasage 358 extends from the reservoir chamber 357 at the one end of the cylinder 351 to connect with the cylinder 351 at the opposite side of the piston 352 so that fluid from the left hand side of the piston can pass through the exhaust port 359 through the passage 358 to the right hand side of the piston 352, and vice versa, upon reciprocation of the body 350 relative to the piston 352.

The ball check valve 360 is provided to permit fluid to enter the cylinder at the left hand side of the piston 352 from the right hand side thereof, but to prevent reverse flow of fluid.

A control valve 361 controls the opening and closing of the port passage 359. This valve 361 is actuated by a centrifugally responsive mechanism 365 so that the valve will open at a predetermined speed of rotation of the body 350 as attached to the propeller. The centrifugally responsive mechanism consists of a pair of centrifugally responsive weights 366 that are pivoted on pivot bearings 367. The weights 366 have arms 368 that engage between the flange 369 to which the valve member 361 is attached and spring seat 370 against which one end of a spring 371 is positioned. The opposite end of the spring 371 engages an adjustable spring guide 372 attached to an adjusting rod 373 that may be locked in position by a jam nut 374. A vent passage 380 prevents a fluid lock from being created in the chamber 381. A vent passage 382 is provided for chamber 383.

In operation, when the speed of rotation of the propeller reaches a predetermined minimum, the centrifugally responsive weights 366 will rotate radially outwardly about the pivot axes 367 against action of the spring 371 to cause leftward movement of the control valve 361 and thus open the port passage 359.

Opening of the port passage 359 frees the body 350 for movement in a right hand direction as caused by the counterweights on the propeller blades, thus allowing the counterweights to shift the propeller blades into high pitch position. At this time fluid from the cylinder 351 on the left hand side of the piston 352 will flow through the passages 359 and 358 to the right hand side of the piston.

While the apparatus disclosed and described herein illustrate preferred forms of the invention, yet it will be understood that mechanical alteration can be made of the devices without departing from the spirit of the invention, and that modifications of the device that fall within the scope of the appended claims are intended to be included herein.

Having thus fully described my invention, what I claim as new and desire to secure by Letters Patent is:

1. A variable pitch aircraft propeller that includes, blades rotatable on their own axes to change the pitch thereof, resiliently acting means connected with said blades to rotate them in one direction, primary centrifugally acting means connected with said blades for rotating them in the opposite direction to change the pitch of the blades, and a secondary mechanism connected with said primary centrifugally acting means to prevent operation thereof to rotate said blades in the said opposite direction including centrifugally responsive means connected with said secondary mechanism to render the same active to release said primary centrifugally acting means when propeller speed is above a predetermined minimum speed.

2. A variable pitch aircraft propeller that includes, blades rotatable on their own axes to change the pitch thereof, resiliently acting means connected with said blades to rotate them in one direction, primary centrifugally acting means connected with said blades for rotating them in the opposite direction to change the pitch of the blades, and a secondary mechanism connected with said primary centrifugally acting means to prevent operation thereof to rotate said blades in the said opposite direction, said secondary mechanism including centrifugally responsive means operably connected with said primary centrifugally acting means releasably holding the same against operation and resiliently acting means operably connected with said centrifugally responsive means resisting operation thereof.

3. A variable pitch aircraft propeller that includes, blades rotatable on their own axes to change the pitch thereof, resiliently acting means connected with said blades to rotate them in one direction, centrifugally acting means connected with said blades for rotating them in the opposite direction to change the pitch of the blades, and a centrifugally responsive detaining mechanism comprising a latching mechanism releasably connected with said centrifugally acting means to detain operation thereof through a predetermined speed range of the propeller operation.

4. A variable pitch aircraft propeller that includes, blades rotatable on their own axes to change the pitch thereof, resiliently acting means connected with said blades to rotate them in one direction, centrifugally acting means connected with said blades for rotating them in the opposite direction to change the pitch of the blades, and a centrifugally responsive detaining mechanism comprising a fluid actuated piston to prevent rotation of said blades in said opposite direction through a predetermined speed range of the propeller operation.

5. A variable pitch aircraft propeller that includes, blades rotatable on their own axes to change the pitch thereof, resiliently acting means connected with said blades to rotate them in one direction, centrifugally acting means connected with said blades for rotating them in the opposite direction to change the pitch of the blades, and a centrifugally responsive detaining mechanism comprising a toggle mechanism releasably connected with said centrifugally acting means to detain operation thereof through a predetermined speed range of the propeller operation.

6. A variable pitch aircraft propeller that includes, blades rotatable on their own axes to change the pitch thereof, resiliently acting means connected with said blades to rotate them in one direction, primary centrifugally acting means carried on said blades for rotating them in the opposite direction to change the pitch of the blades, and a secondary mechanism mounted on said propeller to control rotation of said blades by said primary centrifugally acting means, said secondary mechanism comprising control means extending from said secondary mechanism into operating engagement with said blades for controlling rotation thereof in the said opposite direction, detaining means operably connected with said control means to detain operation thereof, and centrifugally responsive means operably connected with said detaining means to prevent operation thereof through a predetermined speed range of propeller operation.

7. A variable pitch aircraft propeller that includes, blades rotatable on their own axes to change the pitch thereof, resiliently acting means connected with said blades to rotate them in one direction to place them in one pitch position, centrifugally acting means connected with said blades for rotating them in the opposite direction to change the pitch of the blades, a first latching mechanism releasably connected with said centrifugally acting means to detain operation thereof, and a second centrifugally responsive latching mechanism releasably connected with said first latching mechanism to detain operation thereof through a predetermined speed range of propeller operation.

8. A variable pitch aircraft propeller that includes, blades rotatable on their own axes to change the pitch thereof, resiliently acting means connected with said blades to rotate them in one direction, centrifugally acting means connected with said blades for rotating them in the opposite direction to change the pitch of the blades, and a centrifugally responsive locking mechanism releasably connected with said centrifugally acting means to detain operation thereof through a predetermined speed range of propeller operation and including other resiliently acting means connected therewith to regulate the resistance of said locking mechanism, each of said resiliently acting means including means for adjusting the same independently.

9. A variable pitch aircraft propeller that includes, blades rotatable on their own axes to change the pitch thereof, resiliently acting spring means connected with said blades to urge them continuously in one direction of rotation to position the blades in one pitch position, centrifugally acting counterweights connected with said blades for rotating them in the opposite direction against the action of said spring means to change the pitch of the blades, and a latching mechanism releasably connected with said blades to releasably latch the same in the pitch position in which they are placed by said spring means through a predetermined speed range of propeller operation and including means responsive to propeller speed operation to release said latching mechanism at a predetermined speed of propeller operation.

10. A variable pitch aircraft propeller that includes, blades rotatable on their own axes to change the pitch thereof, resiliently acting spring means connected with said blades to urge them continuously in one direction of rotation to position the blades in one pitch position, centrifugally acting counterweights connected with said blades for rotating them in the opposite direction against the action of said spring means to change the pitch of the blades, a locking mechanism releasably connected with said blades to releasably lock the same in the pitch position in which they are placed by said spring means through a predetermined speed range of propeller operation, said locking mechanism comprising a first locking device directly connected with said blades to release them for rotation by said counterweights, and a second centrifugally responsive device connected with said locking device to detain operation thereof through a predetermined speed range of propeller operation.

11. A variable pitch aircraft propeller that includes, blades rotatable on their own axes to change the pitch thereof, actuating means for said blades movable parallel with the axis of propeller rotation, means connecting said actuating means with said blades to rotate the same upon reciprocal operation of said actuating means, resiliently acting means connected with said actuating means to urge the same continuously in one direction to place said blades in one pitch position, centrifugally responsive means connected with said blades for urging rotation thereof in an opposite direction against the action of said resiliently acting means to change the pitch of the blades, said actuating means providing means to prevent said centrifugally responsive means from causing rotation of said blades so long as it is held against movement in one direction, and a detaining mechanism releasably connected with said actuating means and including centrifugally responsive means to govern the action of said detaining mechanism in detaining movement of said actuating means through a predetermined speed range of propeller operation.

12. A variable pitch aircraft propeller that includes, blades rotatable on their own axes to change the pitch thereof, an actuator connected with said blades, resiliently acting means connected with said actuator for urging the same continuously in one direction to place said blades connected therewith in one pitch position, centrifugally acting means responsive to speed of propeller operation connected with actuator to operate the same in an opposite direction of movement in opposition to said resiliently acting means to place said blades connected with said actuator in another pitch position, and a latching mechanism connected with said actuator to detain the same from movement in the direction as urged by said centrifugally acting means through a determined speed range of propeller operation.

13. A variable pitch aircraft propeller that includes, blades rotatable on their own axes to change the pitch thereof, an actuator connected with said blades, resiliently acting means connected with said actuator for urging the same continuously in one direction to place said blades connected therewith in one pitch position, centrifugally acting means responsive to speed of propeller operation connected with said actuator to operate the same in an opposite direction of movement in opposition to said resiliently acting means to place said blades connected with said actuator in another pitch position, and a latching mechanism connected with said actuator to detain the same from movement in the direction as urged by said centrifugally acting means through a determined speed range of propeller operation, said latching mechanism comprising a primary latch for directly releasing said actuator, and a secondary latch responsive to speed of propeller operation releasably detaining said primary latch from operation through a determined speed range of propeller operation.

14. A variable pitch aircraft propeller that includes, blades rotatable on their own axes to change the pitch thereof, an actuator connected with said blades, resiliently acting means connected with said actuator for urging the same continuously in one direction to place said blades connected therewith in one pitch position, centrifugally acting means responsive to speed of propeller operation connected with said actuator to operate the same in an opposite direction of movement in opposition to said resiliently acting means to place said blades connected with said actuator in another pitch position, a latching mechanism connected with said actuator to detain the same from movement in the direction as urged by said centrifugally acting means through a determined speed range of propeller operation, said latching mechanism comprising a centrifugally responsive primary latch directly connected with said actuator to release the same, and a centrifugally responsive secondary latch responsive to speed of propeller operation releasably detaining said primary latch from operation through a determined speed range of propeller operation.

15. A variable pitch aircraft propeller that includes, blades rotatable on their own axes to change the pitch thereof, an actuator connected with said blades, resiliently acting means connected with said actuator for urging the same continuously in one direction to place said blades connected therewith in one pitch position, centrifugally acting means responsive to speed of propeller operation connected with said actuator to operate the same in an opposite direction of movement in opposition to said resiliently acting means to place said blades connected with said actuator in another pitch position, a latching mechanism connected with said actuator to detain the same from movement in the direction as urged by said centrifugally acting means through a determined speed range of propeller operation, said latching mechanism comprising a centrifugally responsive primary latch for directly releasing said actuator a centrifugally responsive secondary latch connected with and releasably detaining said primary latch through a determined speed range of propeller operation, and a resiliently acting means connected with said secondary latch to detain operation thereof until a predetermined speed of propeller operation is obtained.

(References on following page)

References Cited in the file of this patent

UNITED STATES PATENTS

| Number | Name | Date |
|---|---|---|
| 1,834,350 | Schroeder | Dec. 1, 1931 |
| 1,903,628 | Landrum | Apr. 11, 1933 |
| 1,913,733 | Squires | June 13, 1933 |
| 2,259,693 | Hogeman | Oct. 21, 1941 |
| 2,391,778 | Gregor | Dec. 25, 1945 |

FOREIGN PATENTS

| Number | Country | Date |
|---|---|---|
| 558,310 | Great Britain | Dec. 30, 1943 |
| 845,466 | France | May 15, 1939 |
| 931,065 | France | Sept. 15, 1947 |

OTHER REFERENCES

Ser. No. 345,132, Florian et al., (A. P. C.), published May 18, 1943.